Sept. 15, 1936.                W. R. WILLIAMS                2,054,402
                            EXERCISING APPARATUS
                           Filed Aug. 9, 1933         5 Sheets-Sheet 1
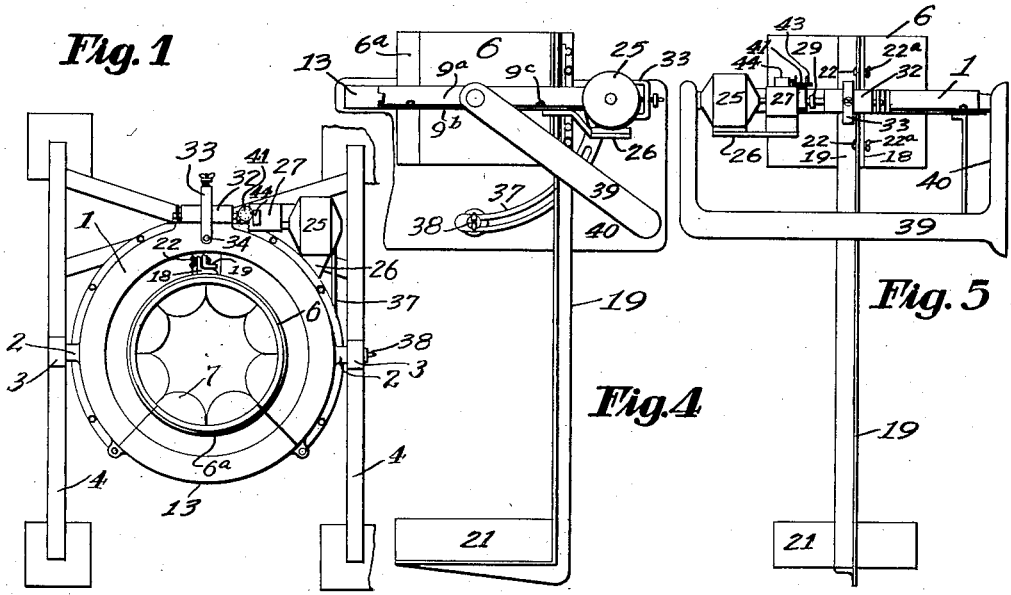
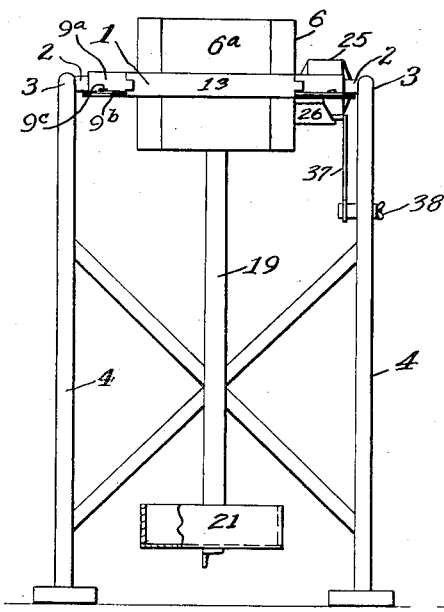
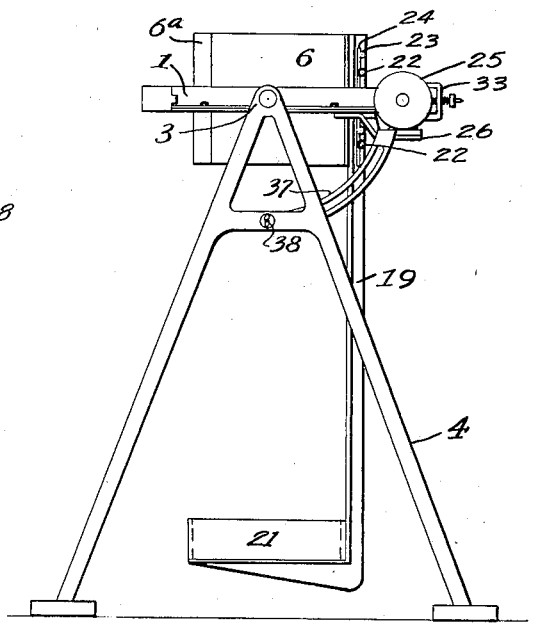
INVENTOR.
Walden R. Williams,
BY
ATTORNEYS.

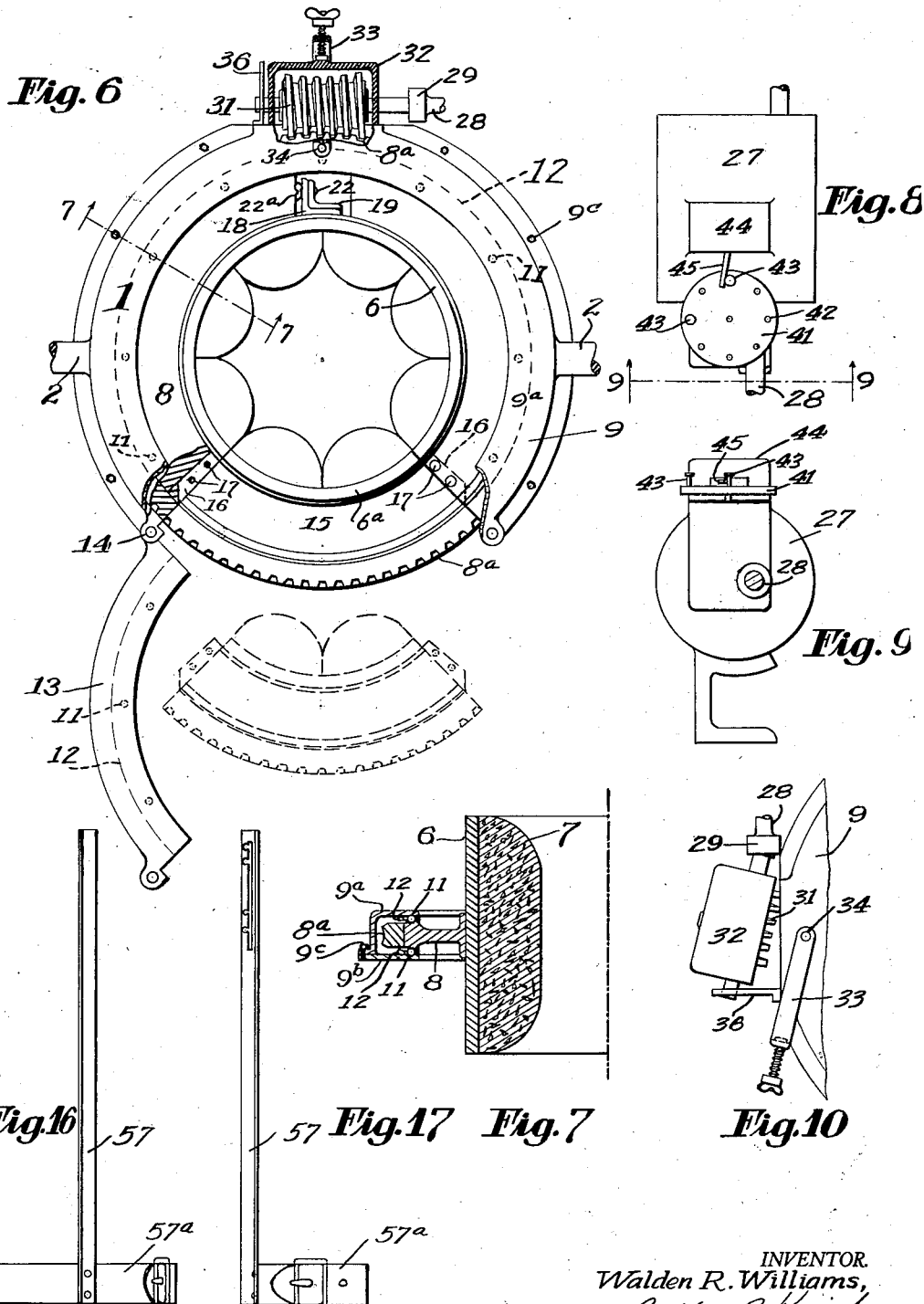

Sept. 15, 1936.  W. R. WILLIAMS  2,054,402
EXERCISING APPARATUS
Filed Aug. 9, 1933   5 Sheets-Sheet 3

INVENTOR.
Walden R. Williams,
BY
ATTORNEYS.

Sept. 15, 1936.  W. R. WILLIAMS  2,054,402
EXERCISING APPARATUS
Filed Aug. 9, 1933  5 Sheets-Sheet 4
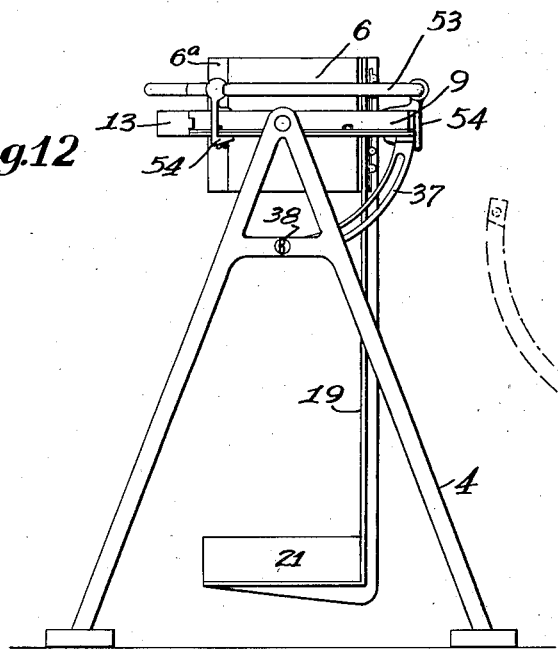
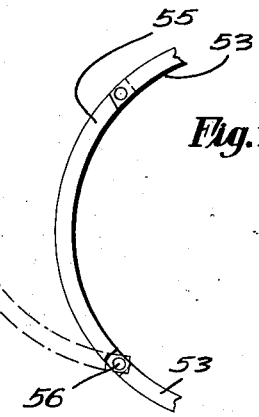
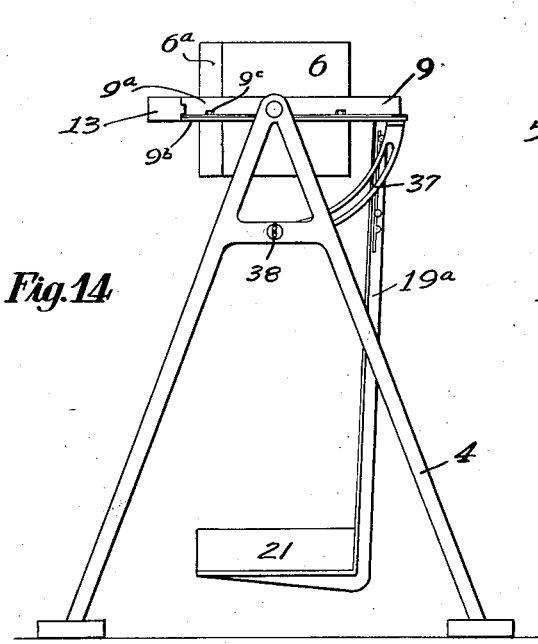
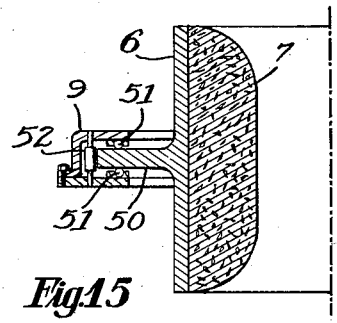
INVENTOR.
Walden R. Williams,
BY
ATTORNEYS.

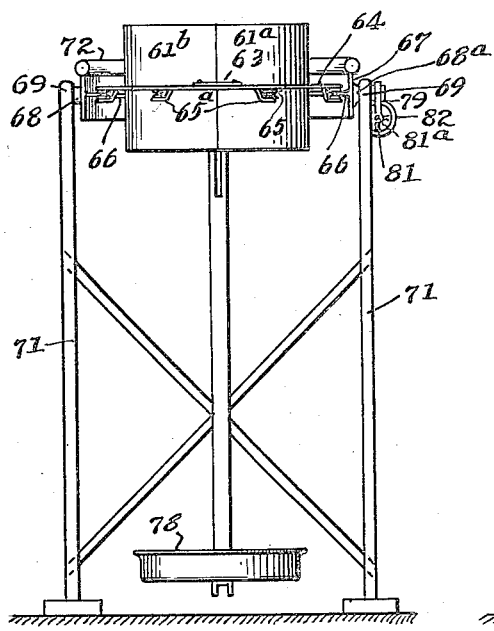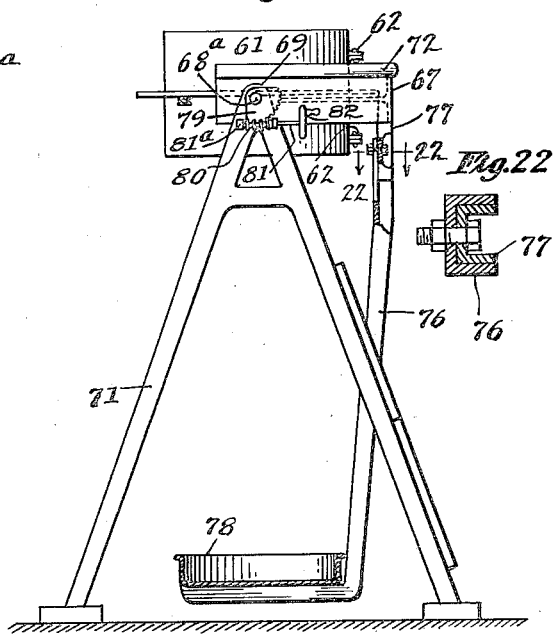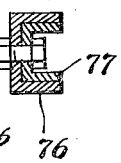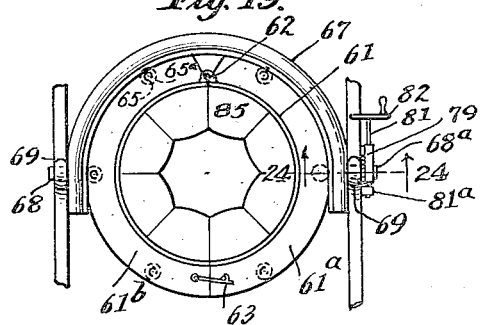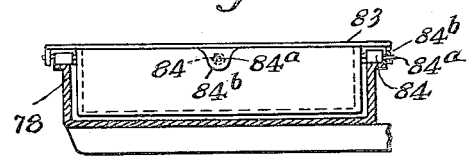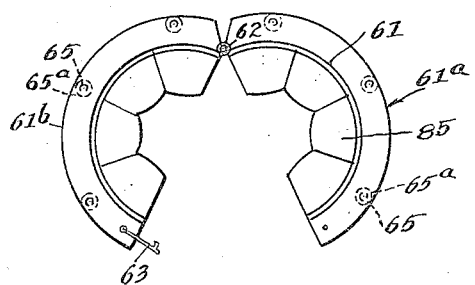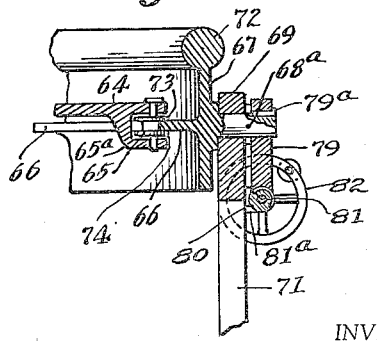

Patented Sept. 15, 1936

2,054,402

UNITED STATES PATENT OFFICE 2,054,402

EXERCISING APPARATUS

Walden R. Williams, Paradise, Calif.

Application August 9, 1933, Serial No. 684,386

7 Claims. (Cl. 128—24)

This invention relates to exercising apparatus and particularly to apparatus for exercising, conditioning and developing the muscles of the torso and lower limbs of a human body or for reducing excess fat deposits, or otherwise improving the physical condition of the body.

One of the principal objects of the present invention is to provide an exercising apparatus adapted to receive the body of a user, secure and support a portion of said body in a firm manner, and exercise other portions of said body by alternately applying and releasing stress upon certain muscles of the body.

A further object of the invention is to provide an exercising apparatus which is equally adapted for exercising an infirm or a robust person.

An important object of the invention is to provide an apparatus adapted to receive the body of an individual and hold the same in a position such that certain muscles therein are brought into play and placed under stress, and adapted to obtain an exercising action upon such muscles by changing the position of said body so that such muscles are caused to change in stress, and alternately contract and relax. A further important object of the invention is to provide an apparatus in which the intensity of stress applied to the muscles may be controlled, and in which the duration of the periods of contraction and relaxation of the muscles may also be controlled.

A further object of the invention is to provide an apparatus adapted to receive the body of a user and secure or support certain portions of said body while leaving other portions of said body in an unsupported condition subject to the action of gravity, and to cause movement of said body whereby gravity-opposing stresses are set up in certain muscles therein and said stresses are continuously and rythmically varied. A further object of the invention is to provide an apparatus of the character described which is mechanically operated to obtain the desired exercising action. A further object is to provide an apparatus which, in one embodiment, may be operated by the user through application of muscular effort. Further objects of the invention will be more particularly set forth in the following description thereof, or will be apparent therefrom.

The device of the present invention may comprise, in its simplest form, means for receiving and supporting a human body by attachment thereto adjacent the middle portion thereof and at such other portions as may be desired, for example, either the lower or upper extremital portion, while leaving other portions of the body, such as the opposite extremital portion, unsupported, and means for rotating said body about an axis extending longitudinally thereof while maintaining said axis at any desired angle to the vertical. The device may be provided, if desired, with mechanical means for causing the rotation of the attached body as shown in the preferred embodiment, or may be provided with means for obtaining the desired rotation through manual means or through application of other muscular effort on the part of the user.

A further object of the invention is to provide an apparatus which may be employed to develop any one portion of the trunk. For example, either the lateral trunk portion or if desired, the ventral trunk portion as well as the dorsal trunk portion may be advantageously exercised and developed to the substantial exclusion of development of other trunk portions. In this connection, lateral spinal curvature (scoliosis) may be straightened or supported by emphasizing the development of the muscles on the convex side of the curve, or, as another example, weakened abdominal muscles may be strengthened without material exercising of the back muscles, et cetera.

The device of the present invention is particularly adaptable to the strengthening of weakened supporting muscles in the trunk, and to correction of postural disturbances of various body organs (ptosis) caused by weakened abdominal muscles. For example, the device may be employed for exercising and increasing the tonus of the muscles which support the abdominal viscera in place, thereby overcoming certain digestive disturbances such as certain forms of constipation and the like. When the device of the present invention is used under the direction of a qualified physician or by a person of adequate anatomical knowledge, it may be employed in particular strengthening of certain trunk muscles to the end that the posture is corrected, necessary in the case of persons in whom the normal curves of the spine have become exaggerated and the front portion of the pelvis has become depressed too far. In carrying out exercising operations, with the present apparatus, the body may be rigidly secured to the apparatus of the present invention at the vicinity of the hips, inclined at an angle to the vertical so that certain supporting muscles of the body, and particularly the trunk muscles, are put under a strain resulting from muscular effort to preserve the longitudinal axis of the body in a straight line, and substantially all the body muscles exercised by varying the direction and intensity of the stresses so imposed upon the body, for example, by rotational movement of the body about the inclined longitudinal axis thereof. The feet or lower limbs of the user's body are preferably maintained in a position along the said longitudinal body axis, and the device of the invention is therefore preferably provided with means for securing or retaining the lower extremital body portion in this manner. However, a similar exercising action may be obtained by supporting the upper extremital and middle portions of the body along the said body axis and leaving the lower limbs free and subject to the action of gravity and rotating the body along an inclined longitudinal axis.

As the user's body is exercised under such conditions that substantially no movement is effected between the various bone joints since the user maintains his body along the aforesaid longitudinal axis by application of muscular effort, the device of the present invention is particularly adaptable for exercising the muscles of an arthritic individual. As is well known, ordinary exercising movement is very painful to an arthritic individual by reason of movement of the arthritic joints and consequently such persons are usually quite under-exercised. With the device of the present invention such a person may obtain substantially any desired amount of muscle exercise without requiring movement of the joints and thus the general condition of the body be materially improved without undue discomfort.

The accompanying drawings illustrate embodiments of the present invention, and referring thereto:

Fig. 1 is a plan view of the preferred form of the invention, provided with means for mounting the same on a floor or the like;

Fig. 2 is a front view thereof;

Fig. 3 is a side view thereof;

Fig. 4 is a side view of the device provided with means for mounting the same on a wall or the like;

Fig. 5 is a rear view thereof;

Figure 11:
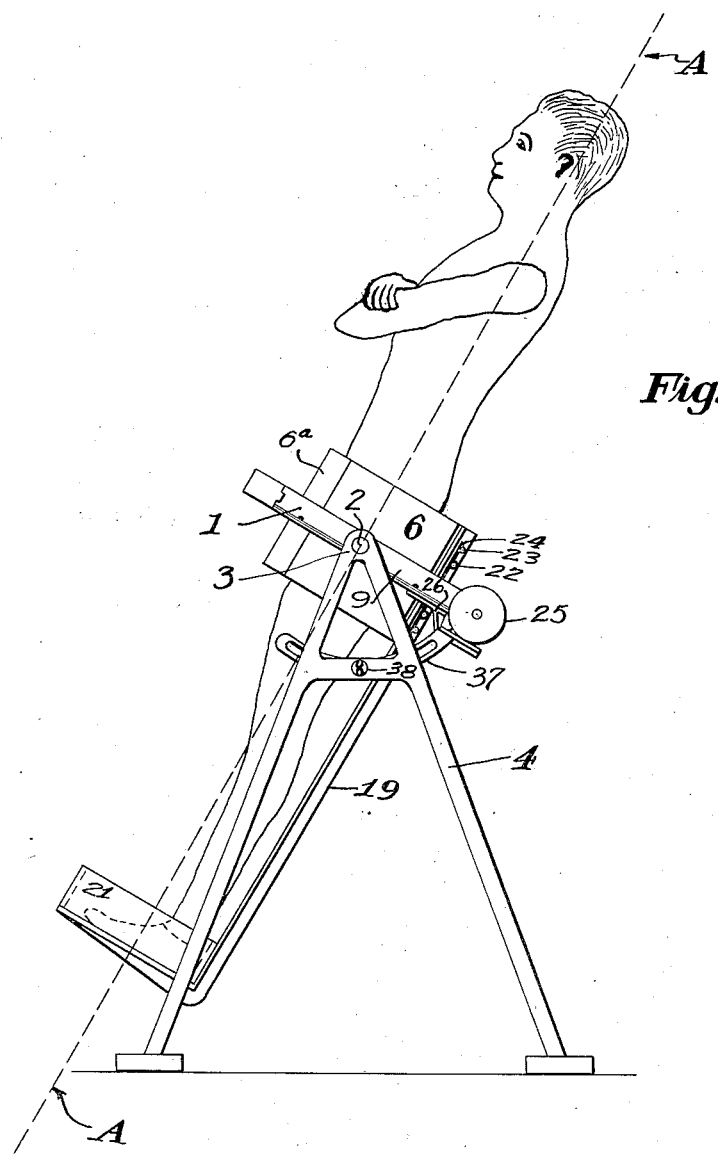

Fig. 6 an enlarged partly sectional plan view of the head portion of the device, adapted to receive the body of a patient;

Fig. 7 is a section thereof taken on line 7—7 in Fig. 6;

Fig. 8 is an enlarged view of the switch operating means for use with the above device;

Fig. 9 is a view thereof taken on line 9—9 in Fig. 8;

Fig. 10 is a detail of the worm drive portion of the device shown in Fig. 6;

Fig. 11 is a side view of the device as it may appear in use;

Fig. 12 is a side view of a modified form of the device; adapted for hand operation;

Fig. 13 is an enlarged broken away view of a portion of the device shown in Fig. 12, showing the removable sector of the hand-rail provided for said device;

Fig. 14 is a view corresponding to Fig. 12 of a further modification of the device;

Fig. 15 is a sectional detail of the mounting means for the head portion of the device, such as may be used in either of the modifications shown in Figs. 12 or 14;

Fig. 16 is a rear view of a shoulder-supporting means which may be used with any of the forms of device shown in Figs. 1 to 12;

Fig. 17 is a side view of said shoulder-supporting means;

Fig. 18 is a front elevation of a further modification of the device;

Fig. 19 is a plan view thereof;

Fig. 20 is a plan view of the removable body-receiving portion thereof, in opened position;

Fig. 21 is a side elevation of the device;

Fig. 22 is a sectional detail thereof, taken on line 22—22 in Fig. 21;

Fig. 23 is a detail of the foot-supporting portion of the device, showing an attachment which may be used therewith; and Fig. 24 is a sectional detail of the device, taken on line 24—24 of Fig. 19.

Referring to Figs. 1 to 3 and 6 to 10 of the drawings, the device of the present invention may comprise a head portion 1 pivotally supported on suitable arms 2 located on a diameter of said head portion, said arms being pivotally mounted on suitable trunnions 3 provided on a supporting structure 4 adapted for placement on a floor or the like. The head portion 1 may comprise an annular body-receiving member such as a collar 6 provided with a suitable cushioning means, such as sponge rubber on its inner surface as at 7, a ring gear 8 secured to said collar and an enclosing structure 9. The ring gear 8 is mounted for rotation within the structure 9, preferably by means of rollers or balls as shown at 11, said balls being constrained to fixed position with respect to the structure 9 by means of suitable retainers or the like 12 but being freely rotatable therein. The rim portion of the ring gear 8 is preferably tapered toward the toothed outer portion 8a, and the balls 11 are preferably disposed in engagement against opposite sides of this tapered portion, whereby side thrust may be resisted and the ring gear securely positioned within the structure 9. The enclosing structure 9 may comprise upper and lower half portions 9a and 9b secured by means of bolts 9c, if so desired, for facilitating assembly of the device. The forward portion of the enclosing structure 9 is preferably provided with a swing-out sector 13 pivotally mounted to the main portion as at 14 and adapted to swing out to some such position as shown in Fig. 6. The ring gear 8 is also preferably provided with a removable sector 15 which may be held in place by means of tongue inserts 16 and pins 17, carrying with it a portion 6a of the collar 6 and corresponding portions of the cushioning members 7. The sections of the ring gear and enclosing structure are made removable to facilitate the placing of a user's body within the area defined by the cushioning members 7.

I provide, at the side of the collar 6 opposite the removable sector 15, attaching means 18 to which may be secured a vertical member 19 carrying a foot holder 21, secured thereto through the agency of bolts 22 provided with wing nuts 22a. The member 19 may be provided with a plurality of positioning holes or notches 23 communicating with a common slot 24 and, for example, two bolts 22 may be provided in spaced relation to the notches 23 whereby they will engage two of said notches for attachment of said member 19 to said collar 6 at upper and lower points with respect to said collar, but whereby the member 19 may be raised or lowered within limits with respect to said collar 6 by positioning said bolts 22 in an upper or lower set of notches.

The ring gear 8 is preferably provided with means for rotating the same, and I have shown this means as comprising an electric motor 25 mounted on a suitably extending portion 26 formed on the enclosing structure 9 and provided with a reducing gear mechanism 27 having a low-speed shaft 28 provided with a universal joint 29 and carrying a worm 31 adapted for engagement with the toothed outer portion 8a of the gear 8. The worm 31 is preferably provided with a housing 32 separate from the enclosing structure 9, and clamp means 33 pivotally secured to the said structure 9 as at 34 for holding the housing 32 in place against the structure 9. The clamp means 33 is adapted to be loosened from the housing 32 and swung to one side, for example as shown in Fig. 10, which allows the housing 32 and the worm 31 to be swung away from the structure 9 about the universal joint 29, to release said worm from engagement with the ring gear 8 so that said ring gear and the thereto attached apparatus may be freely rotated. Suitable guide means 36 may be provided for supporting the free end of the shaft upon which the worm 31 is mounted, if desired.

Referring to Fig. 11, the device of the present invention is adapted to receive the body of a user by surrounding and forcibly engaging said body adjacent the hips or middle portion thereof, with the user's feet resting in the member 21, which may comprise a box-like arrangement within which the feet may be placed comfortably. It will be understood that the supporting member 19 may be so positioned with respect to the collar 6, by adjustment of the bolts 22 in the desired notches 23, that the axis defined by the trunnions 3 may be made to substantially coincide with the hip joint, although it is not absolutely necessary that this coincidence exist. For example, as long as the pelvis is properly secured, the desired exercising action may be obtained. After receiving the user's body, the device is inclined at a suitable angle with respect to the vertical, by rotation thereof on the pins 2 in the trunnions 3, and is preserved in the desired angle of inclination through a slotted link 37 secured to the enclosing structure 9 and provided with a positioning bolt 38 secured to the supporting frame structure 4.

The form of invention shown in Figs. 4 and 5 may be substantially the same as that shown in Figs. 1 to 3, but differing in that the head portion 1 is pivotally supported on a bracket 39 provided with a side plate 40 which may be secured in any suitable manner to a wall surface or the like. This form of invention is adapted for the same use as the above-described form, and merely shows an alternative mounting means therefor.

With a body in an inclined position as shown in Fig. 11, it will be seen that the lower portion of the body is supported in an extended position substantially along the normal longitudinal axis thereof, as designated roughly by the dotted line A, and that gravity will act upon that portion of the body which is unsupported, namely, the portion of the body from the hips upwardly. To obtain the desired exercising action, the user is obliged to maintain his body along or substantially along said normal longitudinal axis. This requires that when the body is in face-upward position, the user contract the ventral trunk muscles such as the rectus abdominis, transversus abdominis and obliquus abdominis of the abdomen and the ventral muscles in the neck for the support of the head. The muscles passing from the hips to the anterior portion of the thighs such as the quadriceps, et cetera, must be contracted to fix the pelvis in relation to the thigh bones. Assuming, then, that the user does attempt to maintain the correct longitudinal position of the body along its axis, as the member 6 is rotated through a 90° angle the user must now contract the lateral trunk muscles and the lateral limb muscles on the side that is uppermost and at the same time, to assist in supporting him along the longitudinal body axis, must contract the medial (adductor) muscles of the other leg. The muscles which are on the lower side of the body will of course be quite relaxed due to the absence of stress thereon. If the body is rotated through 180° to a face-downward position, the muscles which were in contraction when the body was positioned as shown in Fig. 11 will become practically relaxed and the positioning stress will be taken up principally in the dorsal trunk muscles and the posterior muscles of the thighs. Thus, as an example, the scalene, trapezius and rhomboid muscles are now contracted to support the head, neck and shoulders, and the erector-spinae, quadratus lumborum and other muscles posturally related will be contracted also for the support of the lower portion of the spine. The posterior muscles of the hips such as the gluteals and the ham string muscles in the posterior portion of the thigh will be contracted in this position to maintain the desired body axis. Rotation of the body about the longitudinal axis thereof will thus bring substantially all of the body muscles, with minor exception of the arms, into successive states of contraction and relaxation, and proper exercising obtained. The muscles specifically mentioned above may be considered as being typical of the major muscles, but it will be appreciated that substantially all of the trunk and leg muscles are exercised to varying degrees.

It is well known that mere movement of a muscle obtained by alternate contraction and relaxation where no substantial stress is involved will not result in material improvement in the tonus and strength thereof. With the present apparatus, the amount of stress to which the various muscles are subjected may be easily controlled by varying the angle of inclination of the body axis. If the device is to be used for exercising a weak or infirm person, the axis A may be established in a position closely approximating the vertical, while if it is to be used for exercising a relatively robust or athletic person, the inclination may be adjusted toward the horizontal in which latter position it may be used for exercising the most robust individual.

It is also well known that periods of contraction of a muscle must be alternated with periods of rest, and with optimum exercising stresses imposed upon a typical muscle, the period of relaxation should be but slightly less than the period of contraction. According to the present invention the period of relaxation will be substantially equal to the period of contraction during uniform rotation of the body and thus the ratio of contraction period to relaxation period will not be less than unity, however, controlled rotation, as hereinafter described, may change this relation to any desired relative periods of contraction and relaxation, as will be apparent.

As above pointed out, the device of the present invention is particularly adapted for increasing the tonus of the body muscles, but it will be appreciated that this specific use is but one phase of general body conditioning. For example, the present device is highly adaptable to reduction of adipose tissue, and to the consumption of fatty tissue which may lie within or between the body muscles as well as subcutaneous fat. The device may be used by an adipose individual without requiring the consultation of a physician or so-called "reducing expert" in that it may be used in the home or office to obtain a mild or quite strenuous exercising as desired without danger of over-exercising of any particular body portion, and the exercising may be continued until the user has experienced a degree of fatigue which he knows to be an indication of the desired amount of exercising.

In the above-described form of the invention, the member 6 is rotated through the agency of the motor 25, through the gear-reducing means shown at 26. Upon occasion that it is desired to operate the device through but a portion of a revolution and to then reverse the direction of rotation, I provide a timed motor reversal switch means which may comprise an actuating disc 41 geared to the shaft 28 in the ratio existing between the worm gear 31 and the worm wheel 8 so that one revolution of the disc 41 corresponds to one revolution of the member 6. The actuating disc 41 is provided with a plurality of spaced holes 42 within which may be inserted suitable pins or the like 43, and a reversal switch 44 is provided having switch arm 45 positioned for engagement by said pins. Through the use of this apparatus, the portion 6 may be rotated through but a portion of a full revolution, and then reversed so that emphasis may be placed upon the exercising of certain muscles. With the pins 43 positioned as shown in Fig. 8, for example, the portion 6 will rotate through approximately 90° in one direction, stop, reverse its rotation for the same arc, and continue such reversals as long as the motor 25 is energized.

The provision of means for disengaging the worm 31 from the ring gear 8 makes it possible for the device to be stopped with the user's body in any position of rest, the worm 31 disengaged, and the portion 6 rotated so that the portion 15 is brought into correct relation with the section 13 to allow of removal thereof. It will be appreciated that, when the device is again assembled for use, it should be rotated to a position approximating the position at which it was previously stopped, before the worm 31 is re-engaged with the ring gear 8, so that the timed reversal means may register properly with the rotational position of the portion 6.

Use of the present apparatus which involves partial rotation of the body, through the agency of the above-mentioned timed reversal means, will permit emphasis to be placed upon the development of any particular body-portion. For example, in the correction of certain postural disturbances, it may be advisable to exercise principally the abdominal muscles, and the apparatus may then be used to rotate the user's body through an angle of about 90°, for example, 45° to either side of the position shown in Fig. 11. In the particular exercising of any trunk portion, the angle of rotation may be selected with a view to exercising principally such particular portions.

In Figs. 12 to 15 I have shown two alternative forms of the invention, that shown in Fig. 12 being adapted for manual operation, and that shown in Fig. 14 being adapted for pedal operation. These forms of the device may conform quite generally to the form of invention shown in Figs. 1 to 10, with the exception that the collar portion 6 is provided with a radial flange 50 which is not provided with a worm. The flange 50 may be supported by means of ball bearings 51 in much the same manner as is the worm wheel 8, but herein shown in engagement with thrust rollers 52 mounted for rotation in the enclosing structure 9. The enclosing structure is also provided with a swing-out sector 13 pivotally mounted as above-described in connection with the first form of the invention. Referring particularly to Fig. 12, the device may be provided with a foot-supporting member 19 and a foot-holder 21 mounted on the member 6, but instead of the motor drive apparatus, I provide a hand-rail 53 suitably mounted as by means of hangers 54 on the enclosing structure 9. This hand-rail is preferably provided with a swing-out sector 55 hingedly mounted at one end as at 56 and adapted to be swung outwardly to permit the user to place himself in the device.

The form of device shown in Fig. 14 provides for preserving the position of a user's feet along the desired longitudinal axis, but rotation of the collar 6 is obtained by manipulation of the user's feet. For this purpose, the foot-supporting member 19a is adjustably mounted on the enclosing structure 9 instead of upon the collar 6 so that said collar 6 will rotate with respect to the foot-supporting portion of the device. The member 19a may be provided if desired with adjustable mounting with respect to the structure 9 in a manner comparable to the adjustable mounting of the member 19 shown in Figs. 1 to 11.

In Figs. 16 and 17, I have shown a supporting member 57 which may be used to support the shoulders of a user, by removing the member 19, and substituting the member 57 therefor, in which use said member will extend upwardly along the user's back and a suitable harness or strap such as shown at 57a may be employed to secure said member to the upper portion of a user's body. When the device is used with this attachment, the upper or trunk portion of the user's body is forcibly maintained along the desired longitudinal axis, and the lower limbs are exposed to the action of gravity and the apparatus may be employed to exercise either or both of the user's limbs in much the same manner as described in connection with exercising the trunk muscles. It will be appreciated that, even though the apparatus is used in this last-described manner, appreciable exercising of at least the abdominal muscles may be obtained.

In Figs. 18 to 24, I have shown a somewhat more simple form of exercising device which is adapted for either manual or pedal manipulation, and in this embodiment the invention may comprise a body-receiving collar 61 which is divided into right and left-hand half sections 61a and 61b hingedly secured as at 62, and provided with clamp or catch means 63 for maintaining the same in closed relation. The portion 61 is provided with a radially extending flange 64 provided with a plurality of rollers 65 carried in suitable hangers 65a spaced circumferentially thereabout and adapted for engagement with suitable supporting flange 66 carried by a U-shaped frame member 67 provided with diametrically disposed trunnion pins 68 rotatably mounted in suitable trunnions 69 carried by a supporting frame 71. The U-shaped frame member is preferably provided at its upper edge with a rail portion 72 which may be conveniently grasped by the user. The flange 66 provides a semi-circular track which is adapted to receive the rollers 65, which rollers are preferably provided with upper and lower flanges 73 and 74 so as to position the flange 64 longitudinally with respect to said flange 66, as shown particularly in Fig. 24. In this form of the invention I provide a foot-supporting member 76 adjustably mounted on a suitable depending supporting member 77 secured to or formed integrally with the supporting member 67 and carrying at its lower end a circular-shaped foot receptacle 78. In the use of this form of the device, the portion 61 is removed from engagement with the flange 66, the catch 63 loosened and the half-sections 61a and 61b spread apart as shown in Fig. 20, fastened about the hip section of the user and the catch 63 employed to secure said half-sections together. The user then steps into the foot-receiving member 78, and feeds the rollers 65 into engagement with the flange 66. The device is then inclined at a suitable angle to the vertical by manipulation of a suitable inclination adjusting means, such as worm wheel sector 79 keyed as at 79a to one of the supporting trunnion pins 68, for example the pin 68a, and engaged by a worm 80 mounted on a shaft 81 supported on the frame structure 71 in bearings 81a and provided with a hand-wheel 82. The pitch of the worm 80 and the worm wheel 79 is preferably such that the worm will securely position the worm wheel against movement except in response to rotation of said worm by operation of the hand-wheel 82. The device, when in inclined position, will be securely disposed within the frame structure in view of the fact that gravity will act to force the rollers 65 downwardly into engagement with the flange 66. The user may rotate the portion 61 by exerting a turning movement with his feet, or, in case manual operation is desired, a receptacle 83 may be employed adapted to fit within the member 78 and having a plurality of circumferentially disposed rollers 84 mounted on pins 84a carried by lugs 84b and adapted for engagement with the upper edge of the receptacle 78, as shown in Fig. 23. With the user's feet positioned within the receptacle 83, the device may be operated through manual manipulation by grasping the hand-rail 72, the lower portion of the user's body being free to turn. The last-described form of the invention is capable of operation to effect exercising of the body in substantially the same manner as are the other forms of the invention, and is shown as a simple and easily constructed apparatus which may be sold at a relatively low price and thus be available to the general public. The form of device shown in Figs. 1 to 3 as well as the form shown in Figs. 4 and 5 is more adaptable for installation in a physician's office or in gymnasiums, athletic training quarters or the like. In the form of device shown in Figs. 18 to 24, the member 61 and the flange 64 may be conveniently made of relatively lightweight material such as aluminum, so that the weight thereof will not be excessive, and the member 61 may be provided with body-receiving cushions or the like 85 which may be quite comparable to the members shown at 7 above. These cushioning members may be made removable from the body-receiving portions in any of the present described forms of the invention, so that different size cushioning members may be installed in the device for the benefit of various persons of differing hip girth.

I claim:

1. An exercising apparatus comprising means for receiving and supporting a portion of a human body about the middle portion thereof with the longitudinal axis of said body at an angle to the vertical, while leaving the upper portion of said body continuously unsupported, means rotatably supporting said supporting means for rotation about an axis extending longitudinally of said body, and additional supporting means removed from said first-mentioned supporting means along said longitudinal axis and positioned for engagement by the feet of said body for effecting rotation of said body about said axis.

2. An exercising apparatus comprising means for receiving and supporting a portion of a human body about the middle portion and an extremital portion thereof in an extended position substantially along the normal longitudinal axis of said body at an angle to the vertical while leaving the other extremital portion of said body unsupported, and means for effecting a rotational movement of said body about said axis to cause said body to move from a face-upward position to a face-downward position while maintaining said other extremital portion of said body in a continuously unsupported condition.

3. An exercising apparatus comprising means for receiving a human body and supporting a portion thereof including the middle portion and an extremital portion in an extended position substantially along the normal longitudinal axis of said body and at an angle to the vertical while leaving the other extremital portion of said body unsupported, means for effecting a rotational movement of said body about said axis to cause said body to turn about said axis through any desired angle, said supporting means engaging said body in such manner as to continuously maintain the respective portions of said body in their respective supported and unsupported conditions at all positions of rotation thereof about said axis.

4. An exercising apparatus comprising: a fixed supporting structure; an adjustable support member pivotally mounted on said structure for adjustment to different angular positions in a vertical plane; means for securing said adjustable member in any one of said positions; a collar member having its axis lying in said vertical plane and adapted to receive and support the middle portion of a human body; means on said adjustable member rotatably supporting said collar member, for rotation about said axis; and a receiving member carried by said adjustable member, and adjustable therewith, said receiving member being spaced from said collar member along said axis, and adapted to receive and support an extremity of said body.

5. An exercising apparatus as set forth in claim 4, and comprising in addition, driving means operatively associated with said collar member for effecting a positive rotation thereof.

6. An exercising apparatus as set forth in claim 4, and comprising in addition, electrically operated driving means for rotating said collar member, and reversing switch means actuated by rotation of said collar member and operative to periodically reverse said driving means and thereby cause successive alternate rotation of said collar member in opposite directions.

7. An exercising apparatus as set forth in claim 4, and comprising in addition, a handle member rigidly mounted on said adjustable support member adjacent said collar member, in position to be grasped by the hands of said body for manually effecting rotation of said collar member.

WALDEN R. WILLIAMS.